3,562,089
DAMPED LAMINATE

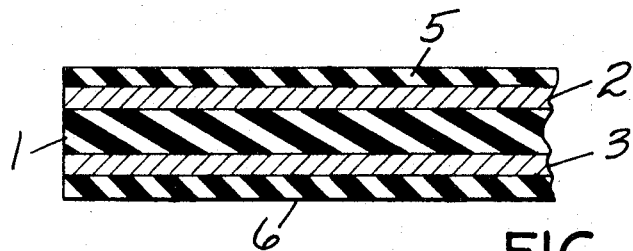
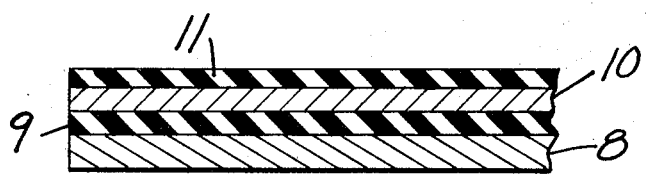
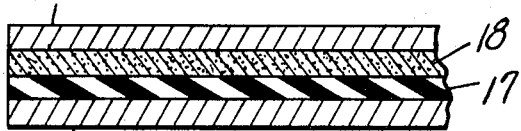
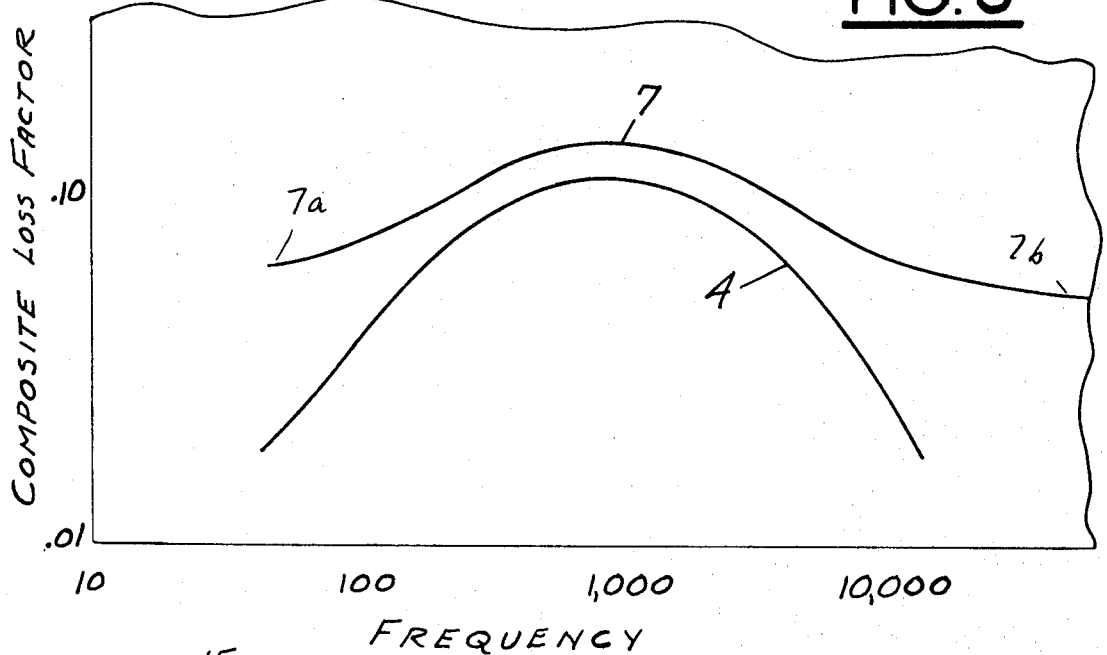
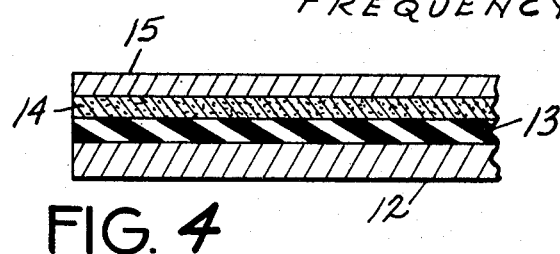

Glenn E. Warnaka and Harold T. Miller, Erie, Pa., assignors to Lord Corporation, Erie, Pa., a corporation of Pennsylvania
Continuation-in-part of application Ser. No. 362,823, Apr. 27, 1964. This application Nov. 1, 1967, Ser. No. 683,086
Int. Cl. B32b 7/02
U.S. Cl. 161—166         11 Claims

ABSTRACT OF THE DISCLOSURE

The magnitude and frequency range of damping provided by a constrained layer damping structure are improved by the addition of an extensional damping layer. If the shear damping layer of the constrained layer structure and extensional damping layer provide peak damping at different temperatures, effective damping will also be provided over a wider temperature range than with the shear or extensional damping layers alone.

---

This application is a continuation-in-part of application Ser. No. 362,823 filed Apr. 27, 1964, now abandoned.

This invention is intended to increase the damping of a structure having constrained layer damping and to broaden the frequency range of effective damping. This is accomplished by incorporating extensional damping characteristics into the constraining layer.

In the drawing, FIG. 1 is a section through a structure having two constraining layers, FIG. 2 is a section through a structure having a single constraining layer, FIG. 3 is a performance curve, and FIGS. 4 and 5 are sections through modifications.

In the drawing, FIG. 1 is section through a laminated structure having two rigid structural members 2 and 3 and three viscoelastic layers 1, 5 and 6.

If only layers 1, 2, 3 were present, the laminate would be well known prior art. The selection of structural and viscoelastic materials 1, 2, 3 is routine. The members 2 and 3 are bonded to opposite sides of the viscoelastic layer 1 and introduce damping by shear of the viscoelastic layer. The constraining layers have low hysteresis and high modulus of elasticity compared to the viscoelastic layer. The parts 1, 2 and 3 have the characteristic loss indicated by curve 4 in FIG. 3. The amount of loss obtained by the composite structure 1, 2, 3 per se will depend upon the internal damping or hysteresis of the viscoelastic layer 1 but the general shape of the curve 4 will always be the same.

In order to increase the damping and broaden the frequency range of the prior art structure 1, 2, 3, viscoelastic layers 5 and 6 are applied to the outer surfaces of the skins 2 and 3. The layers 5 and 6 are characterized by high internal damping or hysteresis and by a modulus of elasticity low compared to the skins. However, compared to the viscoelastic layer 1, the viscoelastic layers 5 and 6 are at least several times as stiff. At frequency corresponding to the peak of curve 4, there is not a great increase in the overall damping. At this peak frequency indicated by the numeral 7, the primary damping takes place by shearing the viscoelastic layer 1 between the skins 2 and 3. This shear involves some bending of the skins 2 and 3 and the bending is resisted by the viscoelastic layers 5 and 6. This resistance by layers 5 and 6 produces some improvement in loss which is attributable to extensional damping in layers 5 and 6.

The major improvement in loss takes place at low and high frequencies such as indicated in FIG. 3 at 7a and 7b where the shear of the viscoelastic layer 1 is reduced. At these low and high frequencies, there is still bending of the skins 2 and 3 and the bending causes damping due to the internal friction or hysteresis of the layers 5 and 6. The composite structure of FIG. 1 not only has a higher magnitude of damping than is provided by layers 1, 2 and 3 alone, but also has damping over a wider frequency range.

A comparable effect is obtained with the structure of FIG. 2 where 8 represents the structure, 9 represents the viscoelastic layer corresponding to layer 1 in FIG. 1, and 10 represents a constraining skin corresponding to either 2 or 3 in FIG. 1. Layers 8, 9, 10 represent known prior art similar to 1, 2, 3 and having the same general shape of loss curve shown in FIG. 3 at 4. When the skin 10 is overcoated with a layer of viscoelastic material 11 at least several times as stiff as the layer 9 but having a modulus of elasticity low compared to the constraining layer 10 and an internal damping high compared to the constraining layer 10, the improvement in damping is of the same kind indicated at 7a, 7, 7b, in FIG. 3.

The properties of the three ply laminates 1, 2, 3 or 8, 9, 10 are well known to those skilled in the art. One without such knowledge can easily obtain the same, for example, by consulting Reference (1)—D. Ross, E. E. Ungar and E. M. Kerwin, Jr., "Damping of Plate Flexural Vibrations by Means of Viscoelastic Laminae," Structural Damping, J. Ruzika, Ed. (American Society of Mechanical Engineers, New York 1959) pp. 49-87, which is incorporated herein by reference. While it is difficult to calculate the properties of such laminates, the properties are very easy to measure and measurement is the usual technique. Measurement techniques are described in Reference (2)—MIL–P–23653A (Ships) and Reference (3)— "Development of Viscoelastic Composition Having Superior Vibration-Damping Capability," Ball and Salyer, The Journal of Acoustical Society of America, Vol. 39, No. 4, pp. 663–673, April 1966, which are incorporated herein by reference. At low frequencies, the prior art three ply laminates deform nearly like a solid beam or like a steel I-beam with little distortion of the viscoelastic core and little damping. At high frequencies, the structural skins are decoupled from one another, that is, the skins do not vibrate in unison, and little damping results because the skins do not work together to achieve distortion of the core. The properties of this well known three ply laminate are those set forth in curve 4 of FIG. 3. The selection of damping materials for such laminates is a handbook matter. See, for example, Nielsen: "Mechanical Properties of Polymers"; Reinhold Publishing Corp., 1962, incorporated herein by reference or technical articles such as Reference (4)—Eric E. Ungar and D. Kent Hatch: "Your Selection Guide to High Damping Materials," Product Engineering, Vol. 32, No. 16, April 17, 1961, pp. 44–56, which is incorporated herein by reference. Reference (4), the Ungar and Hatch article, lists and gives the properties of fifty important viscoelastic damping materials having shear moduli ranging from 2.5 to 43,500 pounds per square inch and loss factors ranging from 1.5 to 5. There is no pretense that this list is complete. Hundreds of additional materials are available. The selection of the damping material is frequently governed by factors such as cost, weight, ambient temperature, vibration frequency, etc. By way of example, and not of limitation, any of these materials may be used in a prior art three ply laminate and the properties of the resultant laminate may be calculated by the complex equations of Reference (1), the Ross, Ungar and Kerwin, Jr. article supra or measured by the techniques of Reference (2), MIL–P–23653A (Ships) or of Reference (3), the Ball and Salyer article, supra.

It was found that by adding a fourth (and sometimes a fifth) viscoelastic or damping layer the properties of the resultant four (or five) ply laminate could be improved from that shown in FIG. 3 by curve 4 to that shown by curve 7a, 7, 7b. This improvement could be realized only when the additional viscoelastic or damping layer was several times as stiff as the viscoelastic layer of the prior art three ply laminate, but still soft compared to the structural layers of the three ply laminate. Unexpectedly, this improvement was effective at both high and low frequencies, the frequencies at which the prior art three ply laminate was deficient. To achieve this improvement, it is not necessary to know the names of the materials of the prior art three ply laminate. The modulus of elasticity and internal damping of the layers of the prior art three ply laminate can be determined by tests. Then, selection of the layers such as 5, 6, 11 to improve the prior art three ply laminate becomes merely a matter of reading a list.

By way of a specific example, the structural skins 8, 10 could be steel, the core 9 could be polyurethane gum as described in Reference (5)—"Dynamic Strain Effects in Elastomers," G. E. Warnaka, Rubber Chem. and Tech., Vol. 36, No. 2, April–June, 1963, and the external damping layer 11 could be U.S. Bureau of Mines Manganese-Copper Alloy E630 described in Reference (6), or Dow Chemical Magnesium Alloy K1X1, described in Reference (7)—"A High Damping Magnesium Alloy for Missile Applications," G. F. Weissman and W. Babington, Proceed. ASTM, Vol. 58, 1958, which are incorporated herein by reference. The urethane gum of Reference (5) is an unfilled cured urethane. As another specific example, the structural skins 8, 10 could be aluminum, the core could be neoprene WRT or neoprene GRT as described in Reference (8)—The Neoprenes, R. M. Murray and D. C. Thompson, Copyright 1963, E. I. Du Pont de Nemours & Co., the sole source for these materials, or the external damping layer 11 could be the damping material described in Reference (2), Military Specification: MIL–P–23653 and in Reference (3), "Development of a Viscoelastic Composition Having Superior Vibration-Damping Capability," G. L. Ball III and I. O. Sayler, JASA, Vol. 39, No. 4, April 1966. The appropriate moduli of the various materials are:

Steel: $E = 3 \times 10^7$ p.s.i.
Polyurethane gum: $G \sim 6{,}000$ p.s.i.
Manganese-copper alloy: $E \sim 1.5 \times 10^7$ p.s.i.
K1X1 magnesium alloy: $E \sim 6.5 \times 10^6$ p.s.i.
Aluminum: $E = 1 \times 10^7$ p.s.i.
Neoprene WRT: $G \sim 1{,}000$ p.s.i.
Neoprene GRT: $G \sim 220$ p.s.i.
MIL–P–23653A: $E \sim 300{,}000$ p.s.i.

These specific examples are not by way of limitation. Keeping in mind the relation between the properties of the layers of damping material, the references cited above give a wide choice of materials which may be used. As a rule of thumb, the layer 11 will usually have a modulus of elasticity approximately ten or more times that of the layer 9 but one tenth or less that of the layers 8, 10.

If the laminate of FIG. 1 carries a load, the load is borne by the structural members 2 and 3 which are coupled together by viscoelastic layer 1. If the laminate of FIG. 2 carries a load, the load is borne primarily by the heavy structural layer 8, although due to the coupling of layer 9, layer 10 may also carry some of the load.

The skins 2, 3 and 10 are shown as overcoated with relatively stiff layers of damping material. The same effect could be obtained by building the damping into the skins 2, 3 and 10. For example, a single layer of viscoelastic material softer than the skins 2, 3, 10 but several times as stiff as the viscoelastic material 5, 6, 11 may be substituted for the coated skins 2, 5; 3, 6; 10, 11. High damping effects are obtainable, but are not usual, with glass fiber reinforced plastics and with some metal alloys such as magnesium alloy K1X1 and manganese-copper alloys developed by the U.S. Bureau of Mines such as alloy E630. These dead materials behave in the same manner as the livelier materials 2, 3 and 10 which have been deadened by the viscoelastic layers 5, 6 and 11.

The curve 7a, 7, 7b shown in FIG. 3 was taken with the FIG. 1 structure where the core material 1 had a shear loss factor of .22 and the skins 2, 5 and 3, 6 had a composite loss factor of .0475. In the curve 4 the response is shown for the skins 2, 3 of typical structural material omitting the coatings 5, 6.

FIG. 4 shows a laminated structure in which 12 is a structural element to be damped, 13 is a stiff extensional damping material, 14 is a soft shear damping material, and 15 is a constraining skin. The peak loss factor or damping capacity of 13 occurs at some temperature above the peak loss factor of 14. Thus at low temperatures the damping of the structure occurs primarily by shearing of 14. At high temperatures the damping of the structure occurs due to bending deformation of or extensional damping by layer 13. Constraining skin 15 may be damped in accordance with the previous disclosure. The purpose is to provide effective damping of a structure over a wider temperature range than is possible with either shear or extensional damping alone.

FIG. 5 shows a laminated structural element in which structural constraining skins 16 are equal load bearing members which are coupled together by the composite core 17, 18. Layer 17 is a stiff extensional damping material and 18 is a soft shear damping material. The performance of this laminate is essentially the same as previously described for the structure of FIG. 4. Skin 16 may be damped in accordance with the previous disclosure.

In FIGS. 4 and 5, the material 13, 17 corresponds to the material 5, 6 in FIG. 1 and 11 in FIG. 2. The material 13, 17 is several times as stiff as the material 14, 18 and the loss factor for the FIGS. 4 and 5 structures corresponds to 7a, 7, 7b.

In FIGS. 1 and 2, if the material 5, 6, 11 has its peak damping at a higher temperature than 1, 9, the damping is provided over a wider temperature range.

What is claimed as new is:

1. A structure subject to vibration having bonded thereto a first coating of viscoelastic damping material having a modulus of elasticity low compared to the modulus of elasticity of the structure, and internal damping high compared to the internal damping of the structure, a restraining layer of structural material bonded to the outer surface of said first coating, said first coating providing shear damping between said structure and restraining layer, and a second coating applied to the outer surface of the restraining layer having a modulus of elasticity several times that of said first coating but low compared to the modulus of elasticity of the structure and having internal damping high compared to the internal damping of the structure for providing extensional damping for said structure, said first and second coatings cooperating to provide composite damping for said structure of greater magnitude and frequency range than provided by either of said coatings alone.

2. The structure of claim 1 in which said second coating comprises a viscoelastic material.

3. The structure of claim 1 in which said second coating comprises a viscoelastic material having its peak damping at a temperature higher than the temperature of peak damping of said first coating with said first and second coatings cooperating to provide composite damping for said structure over a greater temperature range than provided by either of said coatings alone.

4. A structure subject to vibration having bonded thereto a first coating of viscoelastic damping material having a modulus of elasticity low compared to the modulus of elasticity of the structure and internal damping high compared to the internal damping of the structure, and a restraining layer bonded to the outer surface of said first coating having a modulus of elasticity intermediate the modulus of elasticity of said first coating and of the structure and having internal damping high compared to the internal damping of the structure for providing shear damping between said structure and restraining layer, said restraining layer also providing extensional damping for said structure, and said first coating and restraining layer cooperating to provide composite damping for said structure of greater magnitude and frequency range than provided by either of said first coating and restraining layer alone.

5. The structure of claim 4 in which the restraining layer comprises a viscoelastic material.

6. The structure of claim 4 in which the restraining layer comprises a viscoelastic material having its peak damping at a temperature higher than the temperature of peak damping of said first coating with said first coating and restraining layer cooperating to provide composite damping for said structure over a greater temperature range than provided by either of said first coating and restraining layer alone.

7. A structure subject to vibration having bonded thereto a first coating of stiff extensional damping material, a second coating of soft shear damping material bonded to said first coating, the coatings having a modulus of elasticity low compared to the modulus of elasticity of the structure and internal damping high compared to the internal damping of the structure, the first coating being several times as stiff as the second coating, the first coating having its peak damping at a temperature higher than the peak damping for the second coating, and a restraining layer of structural material bonded to the outer surface of the second coating, said first and second coatings cooperating to provide composite damping for said structure of greater magnitude, frequency range and temperature range than provided by either of said coatings alone.

8. The structure of claim 7 in which the restraining layer comprises a viscoelastic material.

9. The structure of claim 7 having a third coating applied to the outer surface of the restraining layer having a modulus of elasticity several times that of the composite first and second coatings but low compared to the modulus of elasticity of the structure and having internal damping high compared to the internal damping of the structure for providing extensional damping for said structure, said third coating cooperating with said first and second coatings to provide composite damping for said structure of greater magnitude and frequency range than provided by either of said coatings alone.

10. A structure subject to vibration having bonded thereto a first coating of stiff extensional damping material, a second coating of soft shear damping material bonded to said first coating, the coatings having a modulus of elasticity low compared to the modulus of elasticity of the structure and internal damping high compared to the internal damping of the structure, the first coating being several times as stiff as the second coating, and a restraining layer of structural material bonded to the outer surface of the second coating, said first and second coatings cooperating to provide composite damping for said structure of greater magnitude and frequency range than provided by either of said coatings alone.

11. A structure subject to vibration having bonded thereto a first coating of stiff extension damping material, a second coating of soft shear damping material bonded to said first coating, the coatings having a modulus of elasticity low compared to the modulus of elasticity of the structure and internal damping high compared to the internal damping of the structure, the first coating being several times as stiff as the second coating, the first coating having its peak damping at a temperature higher than the peak damping for the first coating, and a restraining layer bonded to the outer surface of the viscoelastic coating having a modulus of elasticity intermediate the modulus of elasticity of the composite first and second coatings and of the structure and having internal damping high compared to the internal damping of the structure, said first and second coating and restraining layer cooperating to provide composite damping for said structure of greater magnitude, frequency range and temperature range than provided by either of said first and second coatings and restraining layer alone.

References Cited
UNITED STATES PATENTS

| | | | |
|---|---|---|---|
| 3,087,571 | 4/1963 | Kerwin, Jr. | 161—159 |
| 3,087,574 | 4/1963 | Watters | 161—166 |
| 3,160,549 | 12/1964 | Caldwell et al. | 181—33X |
| 3,117,054 | 1/1964 | Antonucci | 161—160 |

PHILIP DIER, Primary Examiner

U.S. Cl. X.R.

161—190, 217; 181—33